June 1, 1943.  W. G. GREEN  2,320,863
WELL SURVEYING METHOD AND APPARATUS
Filed June 21, 1940
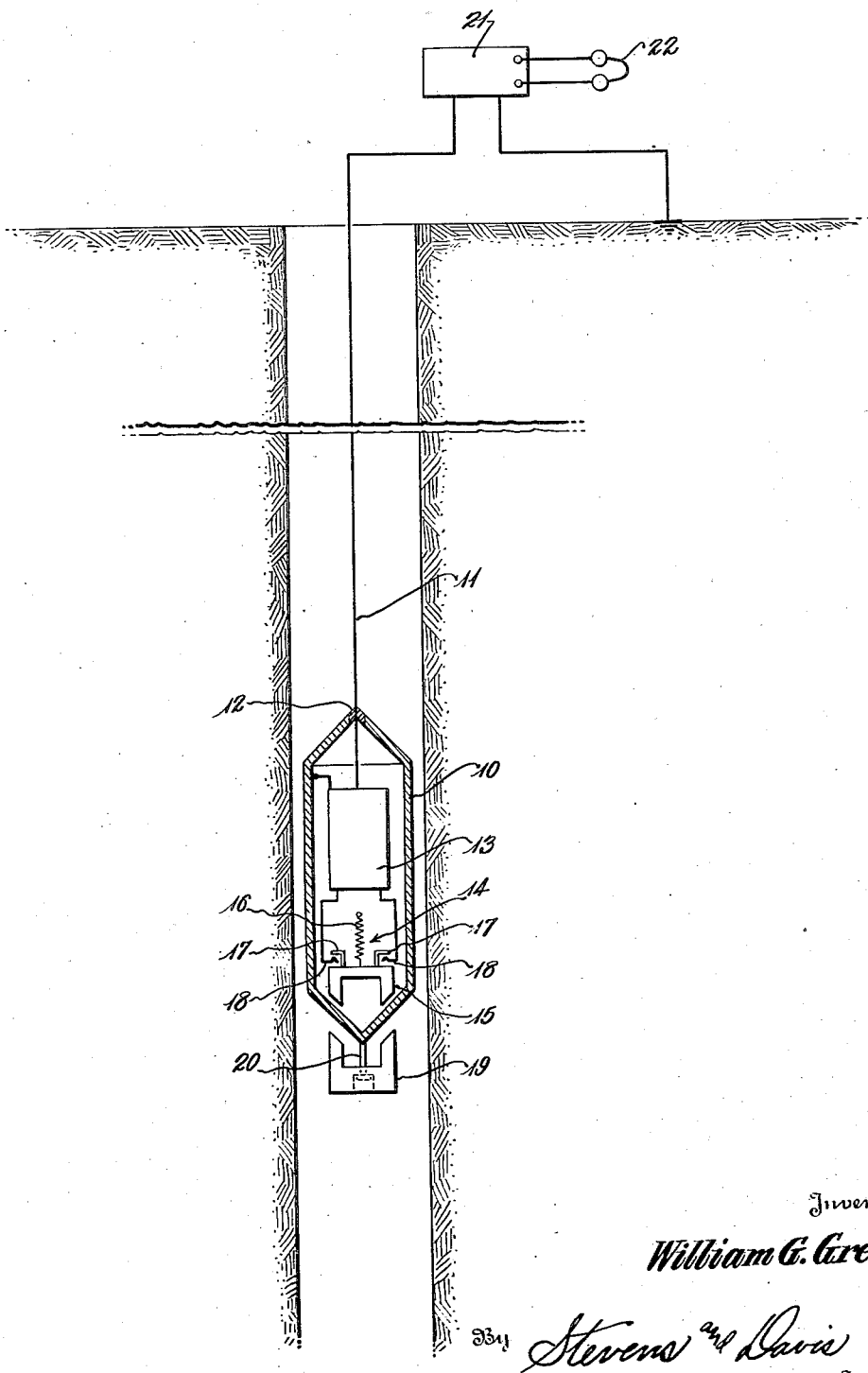
Inventor
William G. Green
By Stevens and Davis
Attorneys Patented June 1, 1943

2,320,863

UNITED STATES PATENT OFFICE 2,320,863

WELL SURVEYING METHOD AND APPARATUS

William G. Green, Tulsa, Okla., assignor to Well Surveys, Incorporated, Tulsa, Okla., a corporation of Delaware Application June 21, 1940, Serial No. 341,753

1 Claim. (Cl. 177—311)

This invention relates to a method and apparatus for determining when a cable lowered into an oil well or similar opening in the ground reaches the bottom of the opening, so that unnecessary lengths of cable will not be lowered into the well and become tangled or fouled therein.

Often in the course of drilling oil wells and the like it becomes necessary or desirable to lower a cable into the opening, usually for the purpose of lowering a surveying instrument or the like to make measurements within the opening. Sometimes it may be desirable merely to lower a cable into an opening to determine its depth. In any event, when a cable is so lowered into an opening in the ground and the opening is of considerable depth, it is practically impossible to tell when the lower end of the cable reaches the bottom of the opening by merely observing that the cable has become slack. A cable itself has considerable weight and when the opening is of some depth the weight of the cable will continue to force the cable down into the opening long after the lower end has touched the bottom. This results in the possible tangling of the cable and also in the possible fouling of the cable on the walls of the opening.

To avoid this the present invention contemplates a method of determining the exact instant that the lower end of the cable touches the bottom of the opening by transmitting a radio signal to the surface of the earth when this event occurs. This may be accomplished by attaching a radio transmitter enclosed in a protecting casing to the lower end of the cable and arranging a switch so that it will be operated when the transmitter comes to rest on the bottom of the opening. The switch may either start the transmitter to operating, stop it, change its frequency or merely modulate its frequency with some second frequency. In any event a signal is transmitted and this signal may be received by surface equipment and used as the desired indication.

The operating switch for the transmitter may be actuated in any manner found desirable but it is important that the transmitter be protected from fluids in the well so it is desirable to seal the transmitter in a housing and avoid movable connections that extend through this housing for the pressures encountered in deep wells are so great that such movable connections are extremely difficult to seal against the entrance of well fluids.

The signals to be transmitted are generally of radio frequency and are preferably dissipated from the supporting cable on one hand and from the enclosure for the transmitter, which is insulated from the cable, on the other. They may, however, be dissipated from a loop antenna having either a vertical or horizontal axis. The transmitter itself is generally of the type in common use for surface radio transmission. The frequency may be anything desired from the very high to the very low. Ordinarily, the device will be used in open holes, that is holes that have not been cased, but it can be operated even though the holes already have a steel casing. In the latter case, however, more power is required for the transmitter and generally a loop having a vertical axis makes the most desirable antenna.

At the surface any sensitive radio receiver may be used, preferably operated from a ground connection, spaced some distance from the hole and the other connected to the cable. When a vertical axis loop is used for transmission in a cased drill hole the best reception will often be obtained by using a loop surrounding the top of the casing as a receiving antenna.

For a better understanding of the principles of this invention and as an example of a simple form of its application in a practical way, one form of device for the practice of this invention has been diagrammatically shown in the accompanying drawing and the following is a detailed description thereof.

As illustrated this device consists of a casing 10 suspended on a cable 11 in a drill hole. The cable is insulated from the casing at 12 so that there will be no electrical connection between them and the casing can be used as one terminal for the radiating circuit while the cable is used for the other. Within the casing 10 which is sealed so that no liquid or fluid may enter is a radio transmitter 13, the output of which is grounded on one side and connected to the cable 11 on the other.

The radio transmitter is controlled by a switch 14 which consists of a U-shaped iron member 15 supported by a spring 16 and carrying contacts 17 that cooperate with fixed contacts 18 to complete a circuit that controls the amplifier so as to either start its operation, stop its operation, change its frequency, or modulate its frequency when the contacts are closed. As it is normally held by the springs, the U-shaped iron member 15 is in such a position that the contacts are open.

Suspended below the casing 10 is a permanent magnet 19 slidably carried on a bolt 20 of brass or some non-magnetic material so that normally it is spaced far enough below the casing 10 that it will not affect the U-shaped iron member 15 within the case. However, the magnet 19 is so arranged that when the casing 10 reaches the bottom of the well it will rest upon the magnet 19 and the magnet will be pressed against the bottom of the casing where its effect will draw the U-shaped iron member 15 downward and close the contacts of the switch 16, thus actuating the oscillator and sending the desired signal out over the supporting cable and the casing to be radiated to the surface.

At the surface a radio receiver 21 is connected between the earth and the supporting cable so as to receive the signal when it is emitted. Headphones 22 have been shown for the purpose of permitting the operator to hear the signal when it reaches the surface, but it will be apparent that a recorder or some other type of signalling means might replace the headphones. In fact, the radio receiver may be connected through relays to automatically stop the lowering of the cable when it touches the bottom. Arrangements may also be made to measure the length of the cable lowered into the earth so as to determine the depth of the opening.

Numerous other modifications will also at once be apparent to those skilled in the art so it is to be understood that this invention is not limited to the specific embodiment shown in the drawing.

I claim:

A device for cable suspension within a deep well bore for locating the well bottom which comprises, a fluid tight hollow capsule, electrical means within said capsule for transmitting a signal to a point exterior of the well bore, a normally open switch also within the capsule for controlling operation of said electrical means, an armature carried by said switch, said armature being interiorly supported from the capsule in proximity to the bottom wall thereof, magnetic means located wholly exteriorly of said capsule and means for supporting said magnetic means from said capsule for vertical sliding movement therebeneath, whereby when the magnetic means strikes the bottom of the well it is displaced upwardly toward the armature to increase the lines of force acting thereon sufficiently to cause the switch to be closed.

WILLIAM G. GREEN.